W. DIETER.
GYROSCOPE BEARING.
APPLICATION FILED JAN. 25, 1919.
1,332,205.
Patented Mar. 2, 1920.
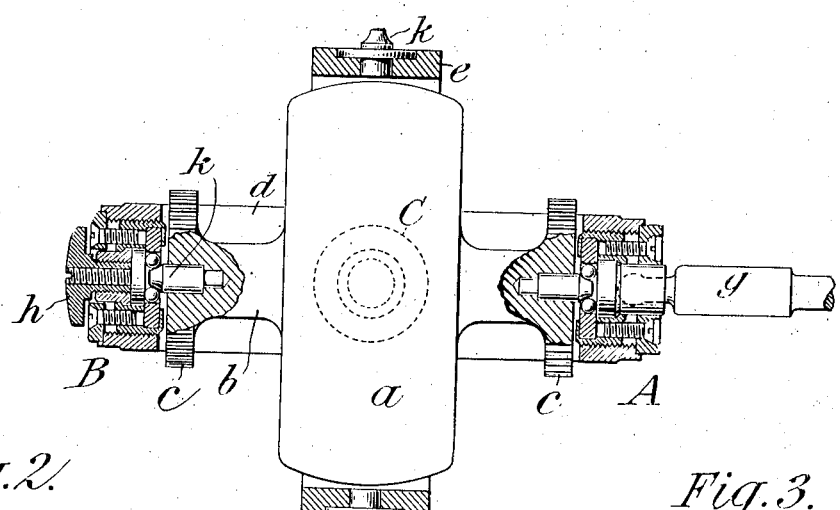
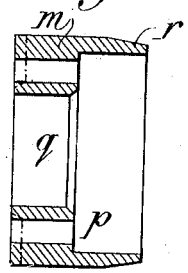
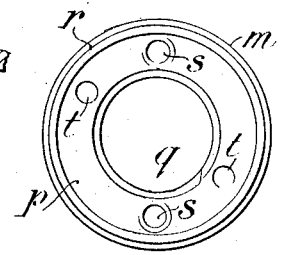
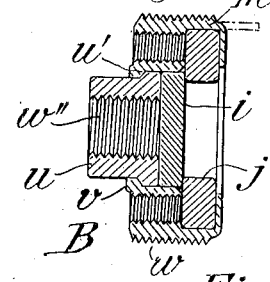
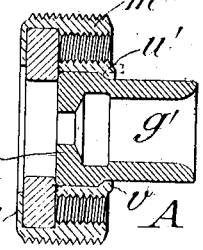
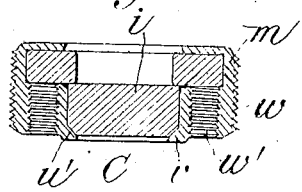
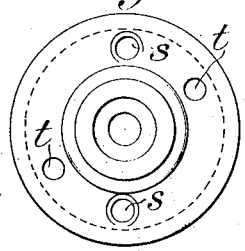
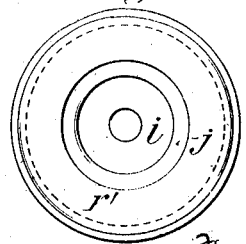
WITNESS
INVENTOR
William Dieter,
By Attorneys,

UNITED STATES PATENT OFFICE.

WILLIAM DIETER, OF BROOKLYN, NEW YORK, ASSIGNOR TO E. W. BLISS COMPANY, OF BROOKLYN, NEW YORK, A CORPORATION OF WEST VIRGINIA.

GYROSCOPE-BEARING.

1,332,205.  Specification of Letters Patent.  Patented Mar. 2, 1920.

Application filed January 25, 1919. Serial No. 273,132.

*To all whom it may concern:*

Be it known that I, WILLIAM DIETER, a citizen of the United States of America, residing in the borough of Brooklyn, county of Kings, city and State of New York, have invented certain new and useful Improvements in Gyroscope-Bearings, of which the following is a specification.

This invention relates to the construction of ball bearings for gyroscopes and analogous instruments, being especially designed for the gyroscopes used for controlling the steering of automobile torpedoes.

The nature of the invention will be made apparent from the description, with reference to the accompanying drawings, wherein, Figure 1 is a sectional elevation of a gyroscope and its bearings, the section being in a vertical plane through the axes of the respective bearings.

Figs. 2 and 3 are respectively an end elevation and a diametrical section of the body or shell of the bearing.

Figs. 4, 5 and 6 are diametrical sections of the three forms of bearings designated respectively as A, B and C.

Figs. 7 and 8 are elevations of the opposite ends of the bearing shown in Fig. 4.

Referring to Fig. 1, $a$ is the fly-wheel and $b$ its hub or spindle, $c$ its pinion, $d$ the inner gimbal ring, $e$ the outer gimbal ring, and $f$ the stationary supporting member, all constructed as is usual with gyroscopes for torpedoes. The pivots of the fly-wheel spindle $b$ are hung in ball bearings A and B respectively, while the pivots of the outer gimbal ring $e$ are hung in ball bearings of which the lower one is shown at C, and the upper may be a duplicate thereof. The bearings A and B differ from each other only in that the former has a socket for receiving the locking bolt $g$ for holding the gyroscope gimbal stationary during the spinning-up operation, while the latter receives a thumbscrew $h$. Each of the bearings A, B and C comprises a hardened disk or button $i$ and a hardened ring or bushing $j$, which together form the stationary raceway in which travel the balls of the bearing, the usual coned pivot $k$ being provided to enter within the balls.

The purpose of the present invention is to provide for suitably assembling and mounting the hardened parts $i$ and $j$ in their proper relation to the other members of the bearing. To this end, these parts are seated in suitable sockets or recesses in a body portion $m$ which itself is screwed into or otherwise seated in the socket portion of the bearing support.

The construction and its advantages may be best understood from a description of the preferable mode of constructing and assembling the bearing.

The body blank is first formed as shown in Figs. 2 and 3, being turned up preferably from machine steel, with a chambered portion $p$ and a central bore $q$. The outer flange $r$ forming the chamber $p$ extends considerably beyond the thickness of the annular bushing $j$ which is to be seated in this chamber. Screw holes $s\ s$ and pin holes $t\ t$ are drilled in the body portion.

In the next operation the hardened bushing $j$, ground to exact size, is inserted within the chamber $p$, whereupon the projecting flange $r$ is turned or swaged inwardly, so as to form a flange $r'$ overlying the outer face of the bushing so as to hold the bushing securely in its seat. Preferably, this flanged portion is then lapped off to reduce its thickness and afford a smooth face.

Next, the disk or button $i$ is introduced from the opposite side into the bore $q$ of the body portion. This disk or button is conveniently of a different form in each of the three forms of bearings A, B and C. For bearing A it is preferably formed integrally with a projecting bushing $q'$ which forms the socket for receiving the bolt $g$. In the bearing B it is a simple thin disk of hardened steel, backed by a separate bushing $u$, the parts $i\ u$ having preferably the same external contour as the one part $i\ q'$ of bearing A. For bearing C, the button $i$ is made thicker and does not project beyond the body. In each of the three forms a shoulder $u'$ is provided. Before inserting the button $i$ (and in Fig. 5 the bushing $u$) the body is turned down so as to form a projecting flange or neck at its rear, surrounding the bore $q$; and after inserting the hardened button (and in Fig. 5 its bushing $u$) this flange is spun or swaged in to tightly embrace the shoulder $u'$, as shown at $r$ in Figs. 4, 5 and 6. The outer screw threads $w$ may be tapped at any convenient stage in the operation, as also the tapping of the inner screw-threads $w'$ in the threaded holes $s\ s$; so also may the threads $w'$ be formed in the bushing $u$.

In other respects than those herein described, the bearings shown do not differ from those already in use.

The described construction of bearing is advantageous in that it provides for the required assembling of the hardened faces constituting the ball race, in proper relation and with mathematical exactness, by operations which are free from any technical difficulties. The parts, once assembled, are permanently united, so that the bearings shown in Figs. 4, 5 or 6 become a self-contained and substantially integral part.

What I claim is:—

1. In a ball bearing, a bearing body having a smaller inner recess and a larger outer recess, a bearing disk in the smaller recess and an annular race member in the larger recess overhanging said disk, and the body having an integral flange which is inturned to confine such race member.

2. In a ball bearing, a bearing body having recesses, an annular race member and a disk housed in said recesses, the bearing body having an inturned flange for confining such race member, and an opposite inturned flange for confining said disk.

In witness whereof I have hereunto signed my name.

WILLIAM DIETER.